C. E. FISCHER.
PLANTER.
APPLICATION FILED APR. 13, 1914.
1,269,591. Patented June 18, 1918.
2 SHEETS—SHEET 2.
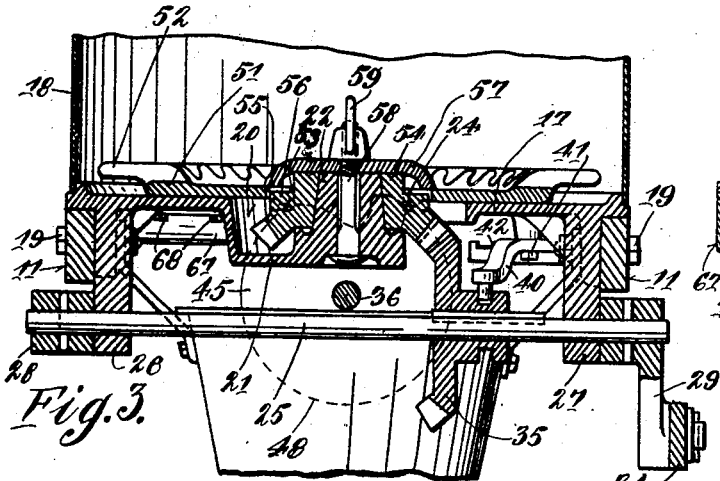
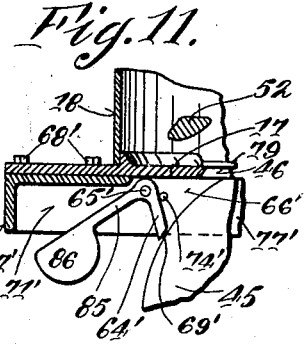
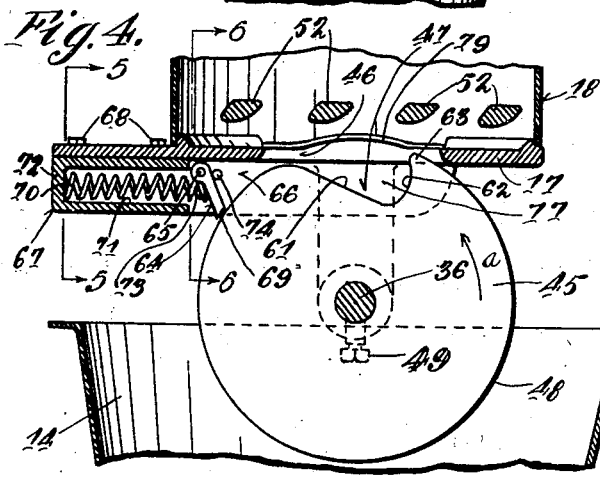
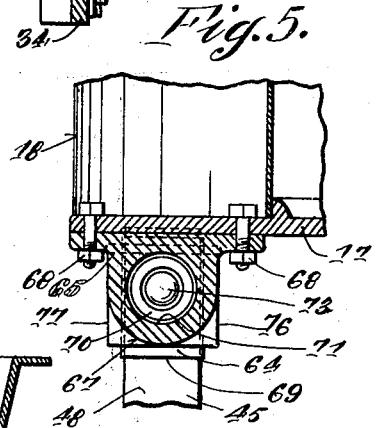
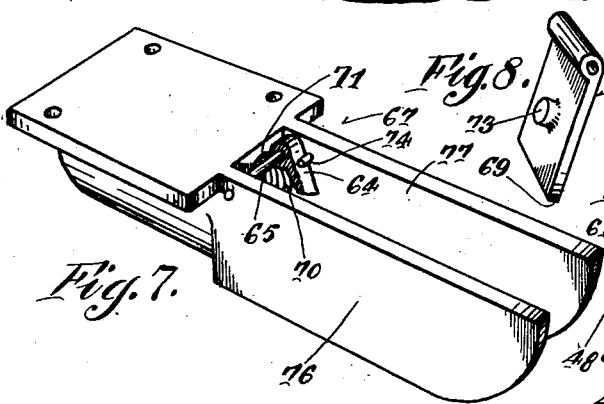
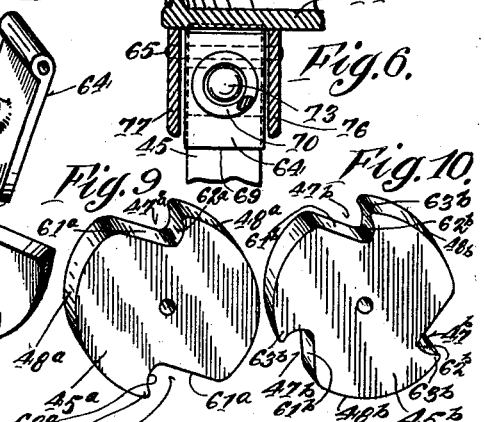
Witnesses:
Jacob A. Hollander
Theresa M. Silber
Inventor:
Charles E. Fischer,
by R. F. Herbsleb,
His Attorney.

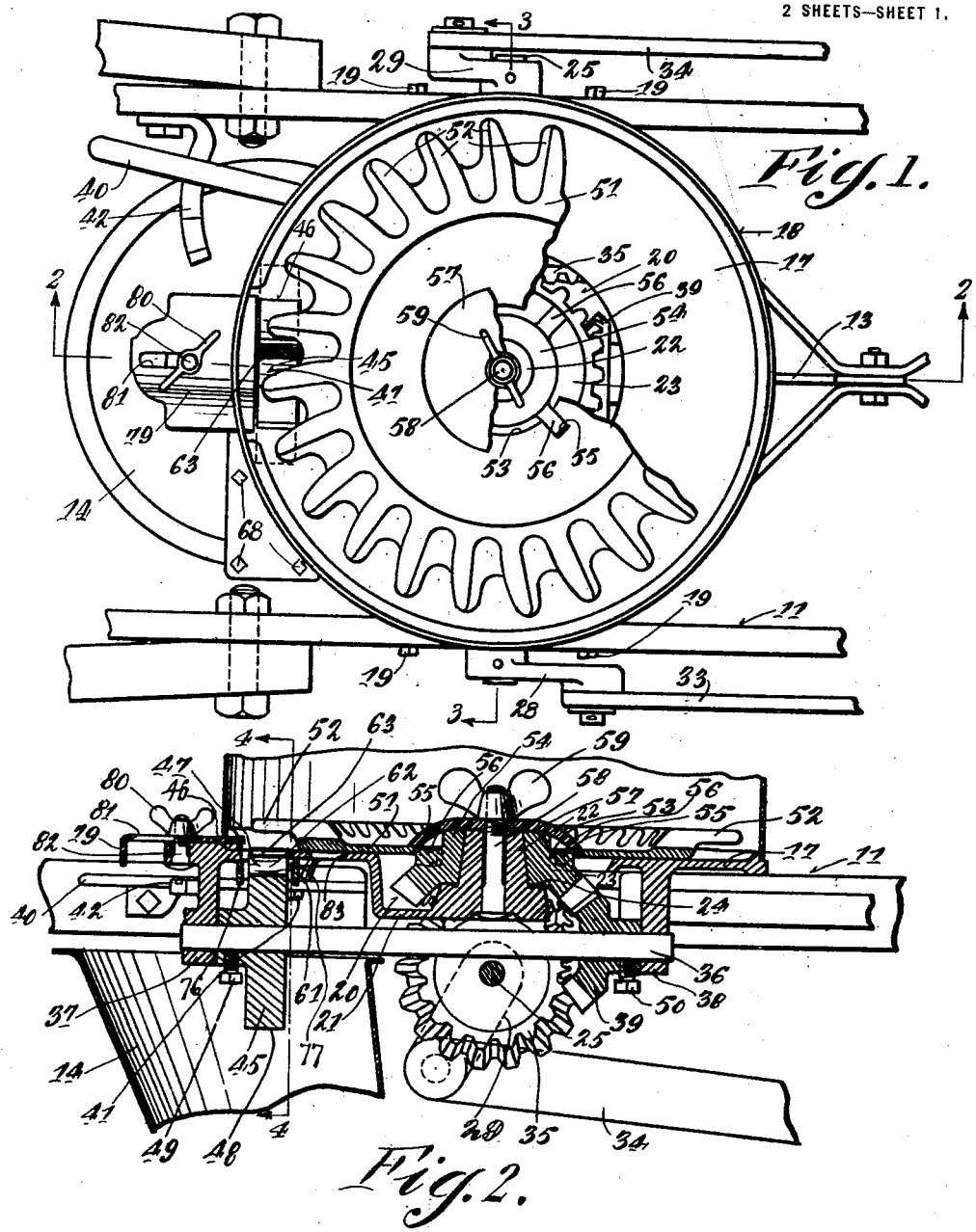

UNITED STATES PATENT OFFICE.

CHARLES E. FISCHER, OF WEST HARRISON, INDIANA, ASSIGNOR TO THE CAMPBELL BROS. MANUFACTURING COMPANY, OF HARRISON, OHIO, A CORPORATION OF OHIO.

PLANTER.

1,269,591.     Specification of Letters Patent.     Patented June 18, 1918.

Application filed April 13, 1914. Serial No. 831,564.

*To all whom it may concern:*

Be it known that I, CHARLES E. FISCHER, a citizen of the United States, residing at West Harrison, in the county of Dearborn and State of Indiana, have invented certain new and useful Improvements in Planters, of which the following is a specification.

My invention relates to planters and is especially adapted to cotton-seed planters. I have exemplified the same in connection with a so-called hiller planter, by means of which the cotton-seed are delivered in bunches to the ground, but it is also applicable to a planter of the character of that shown and described in my application executed of even date herewith for patent on improvements in planters, Serial No. 831,563, filed April 13, 1914. Cotton-seed is covered with lint having a tendency to bunch the seed.

It is the object of my invention to provide novel means whereby the cotton-seed is dropped at predetermined distances apart; further to provide novel means whereby the cotton-seed may be deposited in hills or bunches; further to provide novel means for determining the size of said bunches, and the relative distances between them; and, further, in novel means for controlling the discharge of the cotton-seed; and the invention will be further readily understood from the following description and claims, and from the drawings, in which latter:

Figure 1 is a plan view of so much of a planter as is necessary to illustrate my invention, the hopper being partly broken away to show the operating mechanism for the picker-wheel.

Fig. 2 is a vertical section of the same on the line 2—2 of Fig. 1.

Fig. 3 is a vertical section of the same on the line 3—3 of Fig. 1.

Fig. 4 is a vertical section taken on the line 4—4 of Fig. 2, showing the arrangement of the picker-wheel and pivoted seed-gate.

Fig. 5 is a vertical cross-section of the same, taken on a line corresponding to the line 5—5 of Fig. 4.

Fig. 6 is a vertical cross-section of the same, taken on a line corresponding to the line 6—6 of Fig. 4.

Fig. 7 is a perspective view of the seed-gate housing.

Fig. 8 is a similar view of the seed-gate.

Fig. 9 is a perspective view of an exemplified picker-wheel having two cotton-seed receiving recesses.

Fig. 10 is a perspective view of an exemplified picker-wheel having three cotton-seed receiving recesses of different sizes from those shown in Fig. 9; and Fig. 11 is a sectional detail of a modification.

My invention is applicable in so-called walking planters, in riding planters, and other relations than those herein particularly shown. In the present exemplification the planter comprises a frame 11, a furrow-opener 13, and a seed-spout 14.

The frame supports a plate 17 shown as forming the bottom-plate of the hopper 18. The plate is rigidly secured to the frame, as by bolts 19. The plate is provided with a depression 20, the bottom 21 of which has an upwardly extending boss 22, about which a bevel-gear 23 is arranged to rotate, the bevel-gear being supported on the annular ridge 24 of the boss.

A drive-shaft 25 is journaled in bearings 26, 27, of the plate, and has cranks 28, 29, fast thereon. Connecting rods 33, 34, are articulated respectively to the cranks 28, 29, for driving the drive-shaft 25 from a suitable traction wheel. A bevel-gear 35 is splined to the drive-shaft and shiftable by a shifter 40 pivoted at 41 into and out of mesh with the bevel-gear 23, and held in adjusted positions by a lug 42.

A picker-wheel shaft 36 is journaled in bearings 37, 38, of the plate 17, and as shown extends crosswise of the drive-shaft. It has a bevel-gear 39 thereon which meshes the bevel-gear 23 for being driven thereby.

A picker-wheel 45 is secured to the picker-wheel shaft and coacts with a slot 46 in the bottom-plate 17 of the hopper for drawing the cotton-seed downwardly out of the hopper into the seed-spout. It rotates in the direction of the arrow *a*. The picker-wheel extends outwardly from and substantially at right angles to said bottom plate. Its periphery is provided with one or more seed-receiving portions and one or more seed-excluding portions, the seed-receiving portions being exemplified as hilling recesses.

Thus in Fig. 4 the picker-wheel is shown provided with a cotton-seed receiving recess 47 for receiving a hilling or bunch of cotton-seed and drawing the same out of the hopper, and with a plain peripheral portion 48 acting to exclude the cotton-seed from the picker-wheel and prevent its being drawn from the hopper. In Fig. 9 the picker-wheel is shown provided with two of such recesses and plain peripheral portions, designated by similar reference numerals with the exponent $a$, and in Fig. 10 the picker-wheel is shown provided with three of said recesses and plain peripheral portions, designated by similar reference numerals with the exponent $b$. These picker-wheels and others of a different arrangement, depending on the character of dropping of the seeds to be accomplished, are arranged to be substituted for each other on the picker-wheel shaft and secured thereto for coaction with the seed-slot of the hopper.

The picker-wheels are arranged to rotate continuously, the sizes of the hillings or bunches of cotton-seed and the distances between feeding periods being determined by the sizes of said recesses and the number of said recesses in the picker-wheel.

For permitting ready substitution of differently arranged picker-wheels, the picker-wheels are secured to the picker-wheel shaft 36 by means of a set-bolt 49, and the gear 39 is secured to said shaft by a set-bolt 50, the set-bolts being readily unclamped for permitting the picker-wheel shaft to be driven endwise sufficiently to permit the substitution.

A finger-plate 51 provided with fingers 52 is arranged to rotate in the bottom of the hopper for agitating the cotton-seed and passing the same toward the picker-wheel. The finger-plate has a central opening 53 the wall of which is received about the hub 54 of the gear 23 and is provided with notches 55 in which lugs 56 on said hub are received for forming drive-connection between said gear 23 and the finger-plate. A cover-plate 57 is received over said drive-connection. A bolt 58 extends through the boss 22 and has a nut 59 at its top for clamping the cover-plate to the boss and permitting free rotation of the gear 23 and the finger-plate. Continuous rotation is thereby imparted to the finger-plate.

The forward wall 61 of the seed-receiving recess in the picker-wheel is preferably a gradually receding wall for readily receiving the cotton-seed, and the rear wall 62 thereof is preferably in the form of a tooth or claw 63 which forces the cotton-seed in the recess to rotate with the picker-wheel in such manner as to deliver the hilling or bunch of cotton-seed in said recess to the seed-spout.

A preferably pivoted seed-gate is provided for controlling the dropping of seed from the cotton-seed recess in the picker-wheel, this seed-gate being preferably resiliently pressed toward said picker-wheel, as by a spring or weight. The pivoted seed-gate is shown at 64 and is pivoted as on a pin 65 closely adjacent to the bottom of the bottom-plate of the hopper and slants downwardly toward the periphery of the picker-wheel for forming a cotton-seed receiving recess 66 between said swinging gate, the bottom of said bottom-plate and the periphery of the picker-wheel, into which the cotton-seed is arranged to be received from the cotton-seed recess in the picker-wheel when the latter is being discharged, the rear wall of the recess in the picker-wheel urging the cotton-seed against said seed-gate for swinging the same open and permitting the cotton-seed in the recess to be discharged but preventing the discharge of excess cotton-seed.

The seed-gate is shown pivoted in a housing 67 rigidly secured to the bottom of the bottom-wall of the hopper by bolts 68. Its edge 69 is arranged to coact with the periphery of the picker-wheel, and is arranged to be positioned closely adjacent to the seed-excluding portions of said periphery. It is normally urged toward the picker-wheel by a spring 70 in the cavity 71 of the housing, the spring being located between the outer end wall 72 of said housing and said swinging gate, the inner end of said spring being received about a lug 73 at the rear outer face of said gate. A pin 74 on the housing acts as a stop for limiting approach of the edge 69 of the gate toward the picker-wheel and preventing its entrance into the seed-receiving recess of the picker wheel and preferably locating said edge close to but out of contact with the seed-excluding portion of the periphery of said picker-wheel.

The housing is preferably provided with extensions 76, 77, projecting toward the picker-wheel for forming side-walls for the cotton-seed receiving recess 66. The side walls prevent the discharge of cotton-seed laterally from said recess. The side walls preferably extend past the seed-slot 46 for retaining the seed in the recesses 47.

A regulating plate 79 is provided for regulating the flow of seed by regulating the width of the seed-slot 46. It is arranged to be clamped in selective positions by means of a nut 80, the plate being provided with a slot 81 through which the bolt 82 for the nut is received.

If it is desired to employ the planter for planting other than cotton-seed, the finger-plate is removed and a suitable other seed-plate having seed-holes, as is well-known in the art, substituted therefor, the seed-holes being arranged to register with a coacting seed-dropping hole 83 in the bottom-wall of the hopper, for dropping the seed into the seed-spout, the seed-plate having driving connection with the gear 23 similar to the driving connection between said gear and the finger-plate.

In Fig. 11 a modification is shown whereby the pivoted seed-gate is urged toward the picker-wheel by a weight, the parts being indicated by similar but primed reference numerals. An arm 85 extends outwardly from the swinging seed-gate and is rigid therewith, the arm having a weight 86 thereon for urging the seed-gate 64' toward the stop 74'.

Having thus fully described my invention, what I claim as new and desire to secure by Letters Patent, is:

1. In a planter of the character described, the combination of a seed-hopper provided with a bottom wall having a seed-opening, a rotatable picker-wheel extending under said bottom wall and coacting with said seed-opening, the periphery of said picker-wheel provided with alternate seed-excluding and seed-receiving parts, a swinging gate having a seed-contacted upper face extending from a point adjacent to said periphery upwardly and outwardly below said bottom wall for forming a downwardly contracting sub-hopper between said periphery of said picker-wheel and said seed-contacted face under said bottom wall into which the seed is delivered from said seed-receiving part, and means for normally urging said swinging gate toward said picker-wheel.

2. In a planter of the character described, the combination of a seed-hopper provided with a bottom wall having a seed-opening, a rotatable picker-wheel extending under said bottom wall and coacting with said seed-opening, the periphery of said picker-wheel provided with alternate seed-excluding and seed-receiving parts, a swinging gate having a seed-contacted upper face extending from a point adjacent to said periphery upwardly and outwardly below said bottom wall for forming a downwardly contracting sub-hopper between said periphery of said picker-wheel and said seed-contacted face under said bottom wall into which the seed is delivered from said seed-receiving part, means for normally urging said swinging gate toward said picker-wheel, and a stop for limiting the movement of said swinging gate toward said picker-wheel for normally positioning the lower end of said swinging gate adjacent to but slightly removed from the path of movement of said seed-excluding part.

In testimony whereof, I have hereunto signed my name in the presence of two subscribing witnesses.

CHARLES E. FISCHER.

Witnesses:
THERESA M. SILBER,
NATHANIEL H. MAXWELL.

Copies of this patent may be obtained for five cents each, by addressing the "Commissioner of Patents, Washington, D. C."